United States Patent [19]

Eilentroop

[11] Patent Number: 4,816,649

[45] Date of Patent: Mar. 28, 1989

[54] FLEXIBLE HEATING ASSEMBLY

[75] Inventor: Heinz Eilentroop, Wipperfuerth, Fed. Rep. of Germany

[73] Assignee: HEW-Kabel Heinz Eilentropp KG, Wipperfuerth, Fed. Rep. of Germany

[21] Appl. No.: 114,128

[22] Filed: Oct. 28, 1987

[51] Int. Cl.$^4$ ............................................... H05B 3/34
[52] U.S. Cl. ..................................... 219/549; 219/550
[58] Field of Search ............... 219/547, 548, 549, 550; 338/225 D, 22 R

[56] References Cited

U.S. PATENT DOCUMENTS

| 3,461,275 | 8/1969 | Poole | 219/548 X |
| 3,646,322 | 2/1972 | Speekman | 219/549 |
| 4,575,620 | 3/1986 | Ishii et al. | 219/549 |

Primary Examiner—Elliot A. Goldberg
Assistant Examiner—Marvin M. Lateef
Attorney, Agent, or Firm—Ralf H. Siegemund

[57] ABSTRACT

A flexible heating assembly includes a plurality of stranded or otherwise combined, insulated electrical conductors including feeder lines and, possibly, additional lines and constituting a subassembly; a heating conductor loops around this subassembly in multiple loops; at least two of the feeder line conductors have spaced apart and staggerdly arranged bare spots of removed insulation exposing the respective electrical conductor and the heating conductor where passing across such a bare area will be an intimate electrical contact making relationship without supplemental fastening; the loop density defined as number of loops per unit length on the subassembly is smaller in between bare spots and higher by at least 20% as to loops contacting conductors in a bare spot.

6 Claims, 3 Drawing Sheets

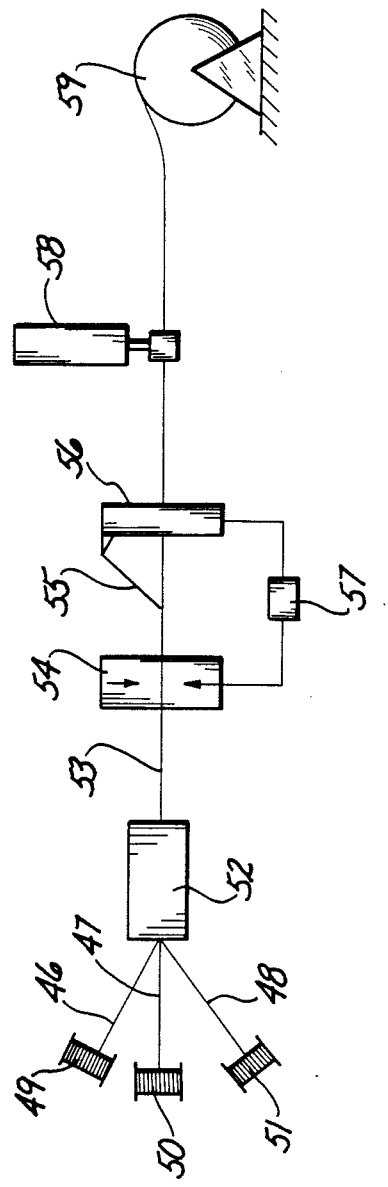

FLEXIBLE HEATING ASSEMBLY

BACKGROUND OF THE INVENTION

The present invention relates to a flexible electrical heat element made of insulated electrical feeder conductors and one or several heating conductors surrounding the insulated feeder conductors, whereby local baring a feeder conductor (not being a heat conductor) permits directly or through contact bridges contact making as between the heading element and the feeder conductor under formation of well defined heating zones. Specifically the wires or conductors may be arranged in juxtaposed positions or they may be stranded or bundled or otherwise combined whereby the heating conductors may in some form surround the electrical conductors either helically or through braiding, weaving, meandering or the like.

Heating elements of the type to which the invention pertains and following basically the outlined above or disclosed German printed patent application Nos. 32 33 904, 32 33 928 and 32 43 061 corresponding to U.S. Pat. No. 4,523,086 and Canadian Pat. No. 1,215,556. Heating elements of this combination and composite configuration can be cut into any kind of length. It is further customary to include a particular conductor which provides for measuring and/or monitoring function or other control operation or for feeding electrical current to farther points if the conductor as used is a rather long one.

The known heating elements for example can be wound upon a tubular conductor with relatively small pitch so that heat distribution on the surface of the tube as compared with other known heating elements with parallel running conductors is considerably improved. However, it can happen that following stronger bending e.g. including bending over small radii and following further restretching of the element assembly the contact between any feeder line and a heating conductor can be interrupted. This may be specifically the case if the heating conductor is made of Cr-Ni base material. Such a material is relatively stiff including particularly detrimental stiffness in the area of contact beween heating and regular conductors. Therefore, on strong bending there may occur physical separation.

In order to remedy the situation of contact disengagement it is known to provide the conductors in the area of the contact making with additional means e.g. soldering or other physical bonding and connection between the electrical feeder conductor and the heating conductor. This is specifically disclosed in German printed patent application No. 23 20 420. The contact between the feeder lines for the heating element pertaining to the cable and the heating conductor proper will in fact be maintained even in case of sever bending. However, it was found that no matter how one approaches this problem and its solution, the additional physical connection when made is a very expensive and significant part of manufacturing cost and, therefore interferes, with an economic continuous production. In addition certain problems obtain if the contact finds different kinds of material to be in direct contact such as the conductors of the feeder lines, the heating conductor and the solder being, third an interposing material.

DESCRIPTION OF THE INVENTION

It is an object of the present invention to build on the prior art as outlined above which is, from an overall point of view, basically satisfactory and has pointed towards a significant development, but for reasons above could stand some improvement in order to maintain with certainty electrical contact bewteen the feeder lines and the heating conductor so that improvements should and are directed towards that aspect without on the other hand making the cost prohibitively high.

In accordance with the preferred embodiment of the present invention, it is suggested to vary the density i.e. the number of loops formed by the heating conductor or conductors so that in the area of contact making there is a higher density than in the in-between areas. It has been found surprisingly that in such a case it is no longer necessary to actually fix the heating conductors physically to the feeder lines at any such point of contact, provided that upon winding or braiding of the heating conductor the larger density rule concerning the loops in the area of contact is consistently observed. Even if no physical fixing is provided for between heating conductor and a feeder conductor, thus even in the case of extreme or severe bending surprisingly the contact making between the feeder conductor and the heating conductor is not interrupted. Moreover the flexibility of the heating conductor as such remains whereby of course the avoiding of soldering or welding is beneficial. Soldering and other physical fastening has inevitably some stiffening effect. Such a stiffness increase is prevented as per the invention while the higher density of the heating conductor of the uneven distribution of loops over the entire length of the cable and heating element has no detrimental effects.

In furtherance of the invention the increase in loop density in the area of contact should amount to at least 20%. It should also be mentioned that, as compared with the other areas, the area of contact making actually remains at a lower temperature level and will, therefore, expand thermally as far as the heating conductor is concerned to a lesser extent; exactly that feature reduces the danger of separation between contact making components.

The invention increases operational reliability without any increase in manufacturing cost as compared with prior art methods avoiding the necessity of physical contact fixing reduces the cost as compared with the heating conductors as made under these known techniques. In addition a continuous production is easily reliazable and one just has to take care that the braiding, weaving or winding speed has to be changed whenever the loop density is to be increased. It was found to be of particular advantage if in the area of contact making the higher loop density actually leads to multiple layers of the heating conductor or the feeder conductor. Such a high density enhances further operational reliability and reduces the thermal level in that particular area. The dense winding, weaving or braiding as such makes sure that in fact the heating conductor is tightly placed into the desired position and thereby it is ensured that the position is maintained. Specifically longitudinal shifting of any loops out of the area of contact making is avoided. Generally, it will be sufficient however to use a single layer of the heating conductor, unless external conditions are somewhat extreme as far as temperature, moisture or the like is concerned; that is to say, a multiple layer configuration may in special cases be needed in between the areas of contact making.

In furtherance of the invention each assembly may include a particular further conductor simply for purposes of expanding the area of use. This is quite independent whether the heating element included in the assembly is flat, braided, stranded or otherwise bundled in a round configuration. Decisive is that the additional conductor is provided, in addition to the requisite number of power feeding conductors, for signaling, controlling, monitoring or range extension functions or the like whereby it is important that this additional conductor or conductors are physically integrated into the overall assembly and become therefore an integrated part of the assembly.

Another advantage to be seen is that for similar construction of the heating element supplemental work at the installation site involves merely making connections such end-to-end connector. Also, there may be a need for parallel stringing of similar heating assemblies in case the power reuirement is higher than provided by a single element assembly. Another feature of the invention is to provide a supplemental conductor or conductors which are merely included in a length of a heating assembly and run along the power and feeder lines in parallel up to an endpoint without contact making. If another length of heating assembly is to be connected at that point, then the supplemental conductor or conductors can serve as the power feeder line for this additional length of heating conductor assembly. The inventive arrangement is therefore particularly characterized by versatility which has to do inter alia with the additional supplemental conductors in the assembly. These conductors can be used as assembly extension as far as feeder line is concerned; they can be used for purposes of increasing the overall power output and can be used alternatively or additionally for purposes of control, measurement or the like in that during certain periods when the power extension is not needed they are operated at a lower signalling voltage.

Generally speaking the inclusion of an additional feeder line or signalling line or supplemental feeder line, over and beyond the minimal requirement for feeder line means that one can, if that is so desired, commensurately increase the heating wire length if the regular feeder line as well as the supplemental line or lines of conductors are all placed in a common plane. The heating wire is helically looped around this flat arrangement or is woven or braided into and through this assembly of parallel conductors. The length of the heater line is the longer the more there are feeder and signalling lines. The heater conductors as looped around the assembly of feeder and supplemental and lines in a relatively shallow pitch makes it is possible to cut any assembly length and still have available sufficient heating power.

For insulating the feeder lines from the heater lines one needs temperature resistive material such as suitable elastomeric polymers e.g. on a Si-caoutchouc basis or a cross linked thermoplastic material or a thermoplastic elastomeric material. Another possibility is the utilization of fluoropolymer such as polytetrafluoroethylene or one of its copolymers having a sufficiently low melting point to be worked from in the molten state. Such copolymers are known for example under the designation FEP, PFA or ETFA. For example FEP is a copolymer of tetrafluoroethylene and perfluoropropelene which can be operated at a temperature of 205 degrees C. PFA is a perfluoroalcoxi copolymer with polytetrafluoroethylene, and its operating temperature is 260 degrees. This corresponds to the temperature range of polytetrafluoroethylene (PTFE) itself. ETFE is also known under the trade name tefzel and is a modified copolymer of tetrafluoroethylene and ethylane at a ratio of 75% to 25%; its long term operating temperature is given to be about 155 degrees C. These materials in combination with insulated threads, glass fibers or the like, are braided, plated, woven assemblies using such fibres and can be provided in separate layers to be applied to the respective heating conductor beforehand.

It is basically known to use fluoropolymer which cannot be worked in the molten state, for example polytetrafluoroethylene itself, for purposes of electrical insulation on electrical wires. Owing to the known difficulties concerning such polymers product length generally is limited. This means that regular conduits, tubes or the like, made of any suitable material but being provided at relatively great length cannot be heated, or only with great difficulties simply because a very long heater using regular PTFE is simply not available.

These difficulties are avoided per the invention by using copolymers of the type mentioned above or by providing an insulation of the feeder lines with intermediate layer and/or with an outer layer being provided initially in an unsintered state in form of a ribbon with sintering occurring in situ. This kind of insulation permits the feeder lines to be made for rather high thermal loads whereby in comparison with shaping by means of powder press working and sintering, the high temperature resisting synthetic material permits higher manufacturing speed, particularly in case of long, basically indefinite production length.

Another advantageous configuration of the invention obtains if the electrical conductors are stranded or bundled around a core. The core may be a tube or tube or conduit system for the passage of liquidous or gaseous material. In such a case the inventive heat element envelops uniformly the tube or tube bundle in its entirety and ensures a completely uniform heating as well as temperature maintenance over the entire periphery for a given length of the tube without requiring supplemental features. Moreover, a particular advantage obtains in that owing to the manufacture of the heating element assembly in accordance with the invention any arbitrary, indefinite length that can be provided for. This is a feature that is directly and immediately applicable to arbitrary lengths of the tube and tube systems to be so enveloped. In the heated configuration the tubes may be made of synthetic material, plastic, metal, Cu, stainless steel or the like and to be made in accordance with suitable manufacturing procedures basically also in endless length which merely require cutting the requisite length at the installation site. This, of course, concerned the tubes as such and the fact that the enveloping heating conductor assembly are not subject to any limitations concerning length cutting, the length cutting of the heating assembly can match exactly the requirements and conditions of length cutting the tubes to be enveloped. Thus, in the case of enveloping the uniformity of feeding in a peripheral direction is independent from the length of the tubing obtained. The same is true in the case of supplemental temperature monitoring of the liquid that is maintained in the conduit or tube bundle system. Here then a supplemental conductor may be stranded into the assembly as temperature measuring element, such as a resistance conductor, a thermoelement or the like to ascertain particularly any local damage as fast as possible including also locating the damage over lengthy tube.

Upon manufacturing a heating element assembly in accordance with the invention it is essential that the number of loops of the heating conductor per assembly unit length is accurately controlled in dependence upon number, position and length of the respective contact points or areas. Such a control is necessary for purposes of continuous manufacture. For this then the individual feeder lines will be bared at a point of contemplated contact. The thus prepared conductors are then, possibly together with other conductors, stranded and/or guided in parallel relationship or stranded onto a core as just mentioned. During further manufacture the position of the contact making areas and their lengths is separately ascertained. Ascertainment results in signals which are used as control signals by means of which then the number of loops of the heating conductor per unit length of assembly is increased or reduced. The heating conductor assembly may be covered with an outer insulation.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 6 shows schematically an assembly line for providing a heating conductor assembly in accordance with the preferred embodiment of the present invention thereby practicing the best mode thereof.

Proceeding now to the detailed description of the drawings FIG. 1 illustrates a heating cable or heating assembly using single heating element 7 and two feeder lines or conductors 1 and 2. These lines 1 and 2 include stranded metal filament cores 3 and 4, respectively covered with insulation 5 and 6. The insulation is made of a high temperature resistant insulating material of the type mentioned above and including for example copolymers of fluor. The two conductors 1 and 2 are placed side by side and are helically looped around by the resistance wire 7 constituting in this specific example the heating element thereby completing, in conjunction with the feeder lines 1 and 2, an elongated heating assembly.

Figure 1:
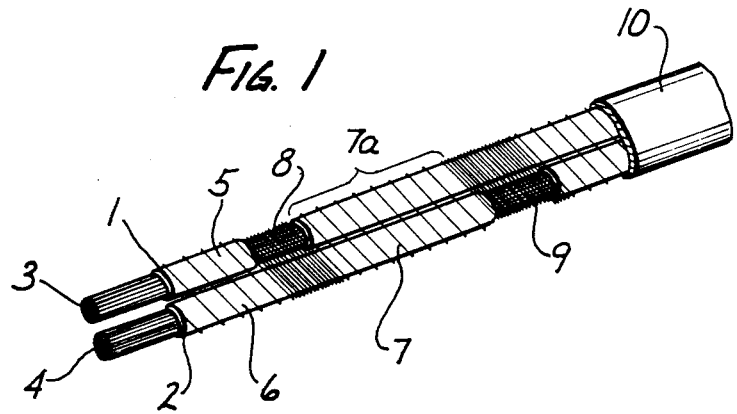
FIGS. 1 and 2 are perspective views of heating conductor assemblies in accordance with the preferred embodiment of the present invention showing successive layers peeled away.

Reference numerals 8 and 9 refer to two bare uninsulated portions 8 and 9 or gaps in the insulation being provided locally where insulation 5 and 6 respectively has been removed. There are similar bare portions along the length of this assembly for each conductor (1,2). Preferably the bare portions are regularly recurring and alternate in this staggered realationship as can be seen from the drawing. The looped around conductor is in metal surface contact relation with the conductive cores 3 and 4 of the two cables 1 and 2 respectively in these bared areas 8 and 9. Therefore electrical contact for current conduction is made and the heater portion such as 7a is being fed with electric current for purposes of developing thermal energy.

In accordance with the invention the number of heating conductor loops per unit area is increased in the contact making areas; i.e. the pitch length of the heating conductor 7 is considerably reduced in the areas of bare portions 8 and 9. Thus, the heating conductor 7 is looped in individual loops such that the individual loops are very closely placed next to each other or even overlap and establish several layers. This way electrical contact between feeder lines and heater is maintained with certainty. The entire assembly is to be seen in an alternating sequence in density variation of the heating wire and heating conductor loops; the loop density is increased in those portions of the feeder where the insulation has been removed and the density is reduced in the in-between portions such as 7a.

The entire arrangement is covered by means of an outer envelope 10 covering principally of course the heating conductor 7 as well as the bare portions of the electrical conductors. Of course the insulation 5 and 6 is also covered but that is incidental and not essential in principle. The cover 10 provides adequte protection against damage and may be comprised of plural layers.

Figure 2:
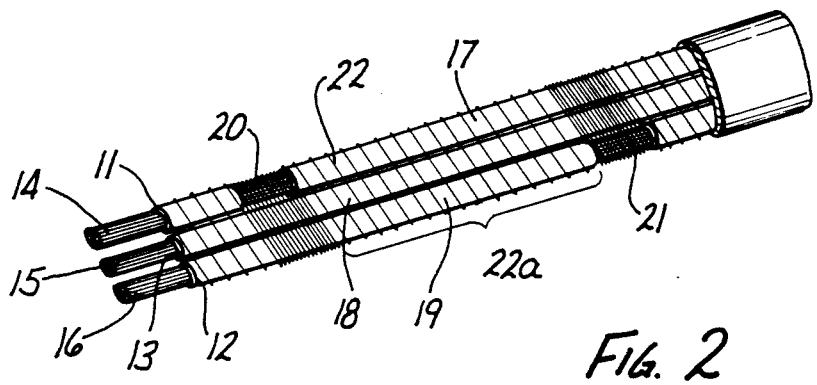

FIG. 2 differs from FIG. 1 by three line parallel configuration. The three conductors or lines 11–13 may be used in a three phase current feed configuration. However, this is only one possibility. The other possibility is actually illustrated. It can be seen that the middle conductor 13 has no bare portion and is not used as a feeder line, only 11 and 12 are feeder lines, and in that regard they are similar to conductors 1 and 2 in FIG. 1 except that now they are laterally spaced from each other by this additional conductor 13.

Other parameters being equal it is immediately apparent that for a same length of assembly and similar pitch of the heating conductor (22 in this example) the effective heating conductor length per assembly length unit is increased on account of the spacing between the feeder lines 11 and 12 which is significantly larger than the spacing between the feeder lines 1 and 2 in FIG. 1 nor on account of inclusion or insertion of the line 13.

The line or conductor 13 serves for example as a control or measuring line. In other words certain signals e.g. in relation to ground, or one of these conductors acting as a zero line, are passed through the line 13 for whatever purpose is desired. The cores 14–16 of the conductors 11,13 and 12 are again of a stranded configuration in order to ensure overall flexibility, and they are provided with electrical insulation cover 17–19 whereby again however as far as the conductors 11 and 12 are concerned the insulation is removed from the areas 20 and 21 respectively. There are of course additional bare portions over the lengths of the particular assembly. Again the heating conductor 22 in this case is very tightly wrapped in the area of bare portions 20. The contact making as between the heating conductor 22 and 14 in area 20 and 16 in area 21 is maintained even in cases of severe bending.

Figure 3:
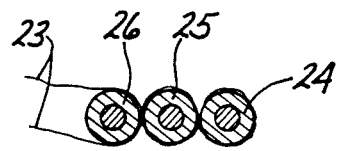
FIG. 3 is a cross section, possibly where indicated in FIG. 2 but also interpretible as a further example.

FIG. 3 illustrates another modification which, as far as the basic conductor assembly is concerned, is as shown in FIG. 2. The three conductors designated by ref. numerals 24, 25 and 26. However, a heating conductor 23 is interwoven or plaited into this assembly of parallel conductors or lines so that one can say that the heating conductor 23 provides alternately loops around each of the conductors. Such plaiting or weaving of the conductor wire into the assembly is of advantage if for some reason or another the signalling conductor should be one of the two outer ones. Moreover, interweaving as shown in FIG. 3 of course ensures still better positive permanent contact making relation of the heating wire and its feeder lines and thus provides for a more mechanically integrated structure.

Figure 4:
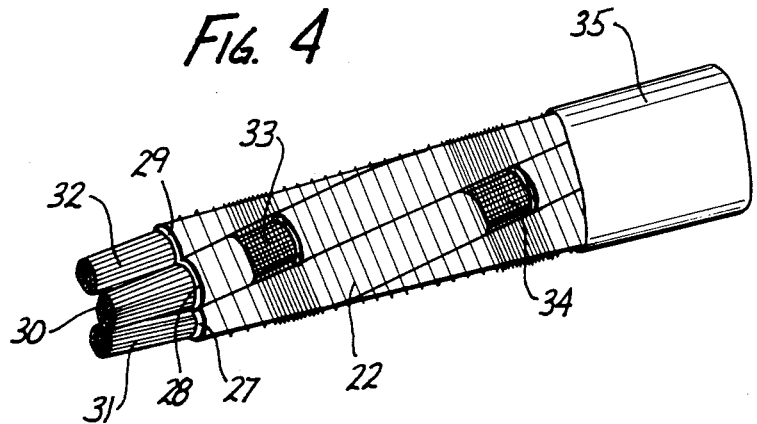
FIGS. 4 and 5 are heating conductor bundle assemblies analogous to the illustration of FIGS. 1 and 2 and still constructed in accordance with the preferred embodiment of the present invention; all these examples are best mode configurations varying in purpose.

Turning now to the embodiment shown in FIG. 4 there are shown three conductors 27–29 which are not placed flat side by side but are stranded together. The insulation of at least two of those conductors (27 and 28) are made of Si caoutchouc or a fluoropolymer that has been extruded, such as FEP, PFA, ETFE, or a ribbon which was sintered subsequent to being wrapped around the respective conductors such as a PTFE band. In each of these instances the insulation is locally removed for individually baring spots or areas; in this case for example from the conductors 27 and 28. There being bare spots 33 and 34 respectively. A heating conductor 22 is looped around the stranded assembly; a helical configuration having been chosen with a very short pitch and also showing a significantly increased loop density in the areas of the bare spots 33 and 34 to permit multiple contact making of the conductor 22 with the conductors 30 and 31. Again, a reliable contact making situation obtains. The entire assembly is jacketed in an extruded Si-caoutchouc cover or envelope 35.

Figure 5:
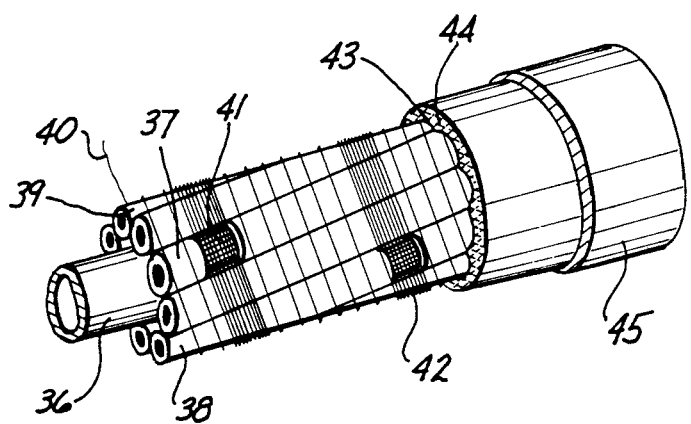

FIG. 5 illustrates an example wherein a conduit is physically integrated in the heating assembly; the conduit is designated by reference numjeral 36 and is provided for the conduction of fluid or liquid. A jacket which could be termed a heating jacket is arranged around this tube 36. The jacket includes electric current feeder lines 37 and 38 as well as supplemental lines 39. All these conductors are stranded together around the tube 36.

A heating conductor 40 loops around the entire assembly in a high pitch helical fashion and again there are bare portions such as 41 of conductor 37 and 42 of conductor 38. The heating conductor 41 makes multiple contact with the respective feeder conductors underneath, and just as before, the number of loops of the heating conductor 4 is increased drastically in the area of bare spots.

The assembly of stranded conductors and helical heating wire loop arrangement carries a cover or layer 43 made of thread yarn, glass wool or the like in form of a mesh, plait or the like. This layer is then enveloped in a heat insulation cover 44 and an abrasion proofing synthetic cover 45 jackets the entire assembly.

The significant advantage of this particular embodiment of practicing the invention is that it ensures a highly uniform heat distribution in the periphery of the tube 36, in every spot, and the assembly as such can be put in any length without interfering with the thermodynamic properties particularly the evenness of heat distribution. The tube 36 can be made of metal or synthetic material and it can be made in practically endless lengths and cut into suitable lengths e.g. in the installation sites.

In lieu of two conductors one could use three feeder conductors to provide polyphase feeding. The frequency of wrapping density along the tubular assembly is considerably increased in this fashion. The drawing of FIG. 5 also shows that there are additional lines/conductors (feeding or signalling) such as 39 which can be used for a variety of purposes. They can be used for control and measuring purposes or as supplemental, being the extending feeder lines which are not to be tapped for a certain length but are available for tapping way down the line.

The heating conductor 22 is shown specifically to be looped around the assembly of stranded conductors but in lieu weaving or plaiting may be provided and for example the heating conductor meanders in alternating curve configurations around the assembly.

The heating wire is made here as well as in the other examples of Cr-Ni alloy. In cases it may be desirable to include self regulation particularly a self limiting feature of the electric current that flows thorugh the heating conductor in order to avoid any kind of damage on account of accidental excess voltage. For this it is of advantage to provide the conductor with a high temperature coefficient such as pure Ni.

Turning now to FIG. 6 there is illustrated by way of example and somewhat schematically production line for continuous manufacturing of a heating cable assembly having in mind a configuration of FIG. 4 or 5 but the manufacturing can be adapted accordingly towards making assemblies of FIGS. 1, 2 or 3.

Reference numeral 49,50 and 51 refer to supply drums for insulated conductors 46,47 and 48 respectively. They are taken in unison off these supply drums and stranded together by stranding machine 52 to obtain the strand 53. It can readily be seen that in the case an assembly of FIG. 5 is to be made, a tube will be run as a core element into and through the machine 52 and the various conductors are then stranded around that tube.

At least two of the conductors 46, 47 and 48 have periodically i.e. equidistantly spaced spots from which the insulation has been (or is being) removed to obtain bare parts such as 41 and 42 as shown in FIG. 5, or the other bare parts equivalent as per the other FIGURES. The feeding of the conductors must be controlled so that there is a phase shift as far as these bare spots are concerned within the stranding machine. A bare part of one of the conductors must occur half way in between two bare portions of the other conductors and vice versa.

Having produced the stranded assembly 53, it passes through a sensor arrangement 54 which monitors bare spots and parts as they occur in length in the stranded assembly. The scanner 54 monitors of course the entire periphery of the strand 53 since basically these bare spots can occur anywhere around the periphery owing to the stranding configuration. In particular it should be mentioned that there is no inherent need to provide for any kind of definite spatial or number relation in the length in between two bare spots and the pitch of stranding. Hence the bare spots will not normally recur in a simple periodic fashion along the conductor arrangement. In fact there may not be any recurring pattern at all or only one with a very long periodicity. This has no particular bearing or practicing the invention. In any event and from an overall point of view, there is a regular recurrence of these bare spots in axial or longitudinal direction, and the specific instants of passage are monitored and signalled by the scanner 54.

Reference numeral 55 refers to the heating conductor which can be any of the conductors which is 22, 7 in the other Figures and being of a Cu-Ni or Cr-Ni base and a spinning machine 56 e.g. a so called rotating tangential spinning machine helically loops the wire 55 around the strand 53. The assembly 53 may, for example, pass through at a constant speed. The loop density and pitch length of the heating wire simply depends on the speed of the spinning device 56. In addition the relative speed of rotation as translated into heating wire length taken relative to the speed and longitudinal passage of the assembly 53, determines the resulting heating power which means that upon changing the speed of the spinner 56 the heating power is changed accordingly.

In accordance with the invention the contact areas and bare spots are monitored by the scanner 54 as stated and whenever that scanner detects bare spots it will go signal to circuit 57 which will temporarily increase the speed of rotation of spinning device 56 so that the number of loops is increased but for a certain period of time only; that period of time is approximately equal to the length of a bare spot divided by the propagation speed of assembly 53.

Thereafter the sped of the spinning device 56 is reduced again to obtain the regular looping; i.e. the areas and zones identified above for example by reference numeral 7a or 17a. Control of the spinning machine is obtained e.g. through a so called electrical shaft arranged between scanner 54 on one hand and spinning machine 56 on the other hand. The drive motor may have a so called disk rotor since the response of such a device is very fast with regard to any speed changes.

Following the winding of heating conductors 55 around strand 53 the assembly passes through one or several extruders 58 to provide one or more covers of suitable material upon the assembly. The resulting assembly may be tested as to integrity and may be stored temporarily on the drum of 59 until used further.

The invention is not limited to the embodiments described above but all changes and modifications thereof, not constituting departures from the spirit and scope of the invention, are intended to be included.

I claim:

1. Flexible heating assembly which includes a plurality of juxtaposed, placed next to each other or stranded or otherwise combined, insulated electrical conductors including feeder lines constituting a subassembly, the assembly further including a heating conductor, the improvement comprising:
   the heating conductor looping around said subassembly of said electrical conductors in multiple loops having a particular density in longitudinal direction of the assembly;
   at least two of said feeder line conductors each having spaced apart bare spots of removed insulation thus exposing an embedded electrical conductor over a particular length, said heating conductor where passing across such a bare area being an intimate electrical contact making relationship without supplemental fastening; and
   said loop density defined as number of loops per unit length subassembly basis being smaller in between bare spots and higher as to loops where contacting a conductor of the electrical conductors in a bare spot.

2. Heating element assembly as in claim 1 wherein the number of loops per unit length in said bare spot area being more than 20% than in between.

3. Improvement as in claim 1 there being a plurality of heating conductor layers in the area of contact.

4. Heating element assembly as in claim 1, adjacent loops in said bare spot area being directly juxtaposed with little or no space in between.

5. The improvement as in claim 1 and including at least one additional conductor that remains fully insulated and is not in electrical contact with said heating wire.

6. Assembly as in claim 1 said conductors being stranded onto and around a tube serving as a core.

* * * * *

UNITED STATES PATENT AND TRADEMARK OFFICE
CERTIFICATE OF CORRECTION

PATENT NO. : 4,816,649

DATED : March 28, 1989

INVENTOR(S) : Heinz Eilentropp

It is certified that error appears in the above-identified patent and that said Letters Patent is hereby corrected as shown below:

On the title page item [19], "Eilentroop" should read -- Eilentropp --.
item [75], "Heinz Eilentroop" should read
           -- Heinz Eilentropp --.

Signed and Sealed this

Seventh Day of November, 1989

Attest:

JEFFREY M. SAMUELS

Attesting Officer     Acting Commissioner of Patents and Trademarks